United States Patent
Souder et al.

(10) Patent No.: US 7,516,221 B2
(45) Date of Patent: *Apr. 7, 2009

(54) HIERARCHICAL MANAGEMENT OF THE DYNAMIC ALLOCATION OF RESOURCES IN A MULTI-NODE SYSTEM

(75) Inventors: Benny Souder, Belmont, CA (US); Debashish Chatterjee, Fremont, CA (US); Lakshminarayanan Chidambaran, Sunnyvale, CA (US); David Brower, Alamo, CA (US); Carol Colrain, Redwood Shores, CA (US); Daniel Semler, Belmont, CA (US); Christopher A. Kantarjiev, Palo Alto, CA (US); James W. Stamos, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 887 days.

This patent is subject to a terminal disclaimer.

(21) Appl. No.: 10/917,873

(22) Filed: Aug. 12, 2004

(65) Prior Publication Data

US 2005/0038834 A1 Feb. 17, 2005

Related U.S. Application Data

(60) Provisional application No. 60/500,096, filed on Sep. 3, 2003, provisional application No. 60/500,050, filed on Sep. 3, 2003, provisional application No. 60/495,368, filed on Aug. 14, 2003.

(51) Int. Cl.
G06F 15/173 (2006.01)
G06F 12/00 (2006.01)

(52) U.S. Cl. .................. 709/226; 709/229; 718/105

(58) Field of Classification Search .......... 709/203, 709/226–229; 718/105
See application file for complete search history.

(56) References Cited

U.S. PATENT DOCUMENTS 5,758,345 A 5/1998 Wang
5,774,668 A 6/1998 Choquier et al.
5,890,167 A 3/1999 Bridge, Jr. et al.
5,918,059 A 6/1999 Tavallaei et al.
6,035,379 A 3/2000 Raju et al.

(Continued)

FOREIGN PATENT DOCUMENTS

| EP | 0942363 A | 9/1999 |
|---|---|---|
| EP | 0942363 A2 | 9/1999 |
| EP | 0 992 909 A2 | 4/2000 |
| WO | WO 02/05116 A2 | 1/2002 |
| WO | WO 02/07037 A | 1/2002 |

(Continued)

OTHER PUBLICATIONS

International Preliminary Examining Authority, "Written Opinion of the International Preliminary Examining Authority," Jun. 7, 2005, 4 pages.

(Continued)

*Primary Examiner*—Zarni Maung
(74) *Attorney, Agent, or Firm*—Hickman Palermo Truong & Becker LLP

(57) ABSTRACT

Approaches are used for efficiently and effectively managing the dynamic allocation of resources of multi-node database systems between services provided by the multi-node database server. A service is a category of work that is hosted on the database server. The approaches manage allocation of resources at different levels. For services that use a particular database, the performance realized by the services is monitored. Resources assigned to the database are allocated between these services to ensure performance goals for each are met. Resources assigned to a cluster of nodes are allocated between the databases to ensure that performance goals for all the services that use the databases are met. Resources assigned to a farm of clusters are assigned amongst clusters based on service level agreements and back-end policies. The approach uses a hierarchy of directors to manage resources at the different levels.

40 Claims, 6 Drawing Sheets

U.S. PATENT DOCUMENTS

| | | | |
|---|---|---|---|
| 6,041,357 | A | 3/2000 | Kunzelman et al. |
| 6,088,728 | A | 7/2000 | Bellemore et al. |
| 6,178,529 | B1 | 1/2001 | Short et al. |
| 6,243,751 | B1 | 6/2001 | Chatterjee et al. |
| 6,272,503 | B1 | 8/2001 | Bridge et al. |
| 6,327,622 | B1 | 12/2001 | Jindal et al. |
| 6,556,659 | B1 | 4/2003 | Bowman-Amuah |
| 6,587,866 | B1 | 7/2003 | Modi et al. |
| 6,601,101 | B1 | 7/2003 | Lee et al. |
| 6,667,751 | B1 | 12/2003 | Wynn et al. |
| 6,728,748 | B1 | 4/2004 | Mangipudi et al. |
| 6,816,907 | B1 | 11/2004 | Mei et al. |
| 7,024,394 | B1 | 4/2006 | Ashour et al. |
| 7,058,957 | B1 | 6/2006 | Nguyen |
| 7,107,294 | B2 | 9/2006 | Romanufa et al. |
| 7,174,379 | B2 * | 2/2007 | Agarwal et al. ............. 709/226 |
| 7,178,050 | B2 | 2/2007 | Fung et al. |
| 7,263,590 | B1 | 8/2007 | Todd et al. |
| 7,269,157 | B2 * | 9/2007 | Klinker et al. ............. 370/351 |
| 2001/0056493 | A1 | 12/2001 | Mineo |
| 2002/0073139 | A1 | 6/2002 | Hawkins et al. |
| 2002/0129157 | A1 | 9/2002 | Varsano |
| 2002/0161896 | A1 | 10/2002 | Wen et al. |
| 2002/0194015 | A1 | 12/2002 | Gordon et al. |
| 2003/0005028 | A1 | 1/2003 | Dritschler et al. |
| 2003/0007497 | A1 | 1/2003 | March et al. |
| 2003/0014523 | A1 | 1/2003 | Teloh et al. |
| 2003/0063122 | A1 | 4/2003 | Cichowlas et al. |
| 2003/0088671 | A1 | 5/2003 | Klinker et al. |
| 2003/0108052 | A1 * | 6/2003 | Inoue et al. ................ 370/399 |
| 2003/0135642 | A1 | 7/2003 | Benedetto et al. |
| 2003/0208523 | A1 | 11/2003 | Gopalan et al. |
| 2003/0217159 | A1 | 11/2003 | Schramm-Apple et al. |
| 2004/0024979 | A1 | 2/2004 | Kaminsky et al. |
| 2004/0111506 | A1 | 6/2004 | Kundu et al. |
| 2004/0117794 | A1 | 6/2004 | Kundu |
| 2004/0176996 | A1 | 9/2004 | Powers et al. |
| 2004/0268357 | A1 | 12/2004 | Joy et al. |
| 2005/0021771 | A1 | 1/2005 | Kaehn et al. |
| 2005/0165925 | A1 | 7/2005 | Dan et al. |
| 2005/0239476 | A1 | 10/2005 | Betrabet et al. |
| 2005/0267965 | A1 | 12/2005 | Heller |
| 2006/0036617 | A1 | 2/2006 | Bastawala et al. |
| 2007/0226323 | A1 | 9/2007 | Halpern |

FOREIGN PATENT DOCUMENTS

| | | |
|---|---|---|
| WO | WO 02/07037 A1 | 1/2002 |
| WO | WO 02/097676 A2 | 12/2002 |
| WO | WO 03/014928 A | 2/2003 |
| WO | WO 03/014928 A1 | 2/2003 |
| WO | WO 03/062983 A | 7/2003 |
| WO | WO 03/062983 A2 | 7/2003 |

OTHER PUBLICATIONS

Current Claims of International Application No. PCT/US04/26570, 4 pages.
Patent Cooperation Treaty, "Notification of Transmittal of the International Preliminary Report on Patentability," PCT/US2004/026405, dated Oct. 10, 2006, 7 pages.
Amended Claims, PCT/US2004/026405, dated Apr. 6, 2006, 4 pages (attached).
International Preliminary Examining Authority, "Notification of Transmittal of International Preliminary Report on Patentability," PCT/US2004/025805, dated Nov. 18, 2005, 16 pages.
Ravi Kokku et al., "Half-pipe Anchoring: An Efficient Technique for Multiple Connection Handoff," Proceedings 10th International Conference on Network Protocols, Nov. 12, 2002, XP010632563, 10 pages.
Ying-Dar Lin et al., "Direct Web Switch Routing with State Migration, TCP Masquerade, and Cookie Name Rewriting," Globecom 2003, IEEE Global Telecommunications Conference, Dec. 12003, IEEE, CP010677300, pp. 3663-3667.
International Searching Authority, "Notification of Transmittal of the International Search Report and the Written Opinion of the International Searching Authority, or the Declaration," Nov. 12, 2004, 13 pages.
Current Claims of International Application No. PCT/US2004/026570, 4 pages.
Current Claims of International Application No. PCT/US2004/025805, 8 pages.
International Searching Authority, "Notification of Transmittal of the International Search Report and the Written Opinion of the International Searching Authority, or the Declaration," dated Dec. 3, 2004, 12 pages.
International Searching Authority, "Notification of Transmittal of the International Search Report and the Written Opinion of the International Searching Authority, or the Declaration," PCT/US2004/026405, dated Jan. 6, 2006, 13 pages.
Current Claims, PCT/US2004/026405, 7 pages.
Chase, Jeffrey S., et al., "Dynamic Virtual Clusters in a Grid Site Manager," Proceedings of the 12th IEEE International Symposium on High Performance Distributed Computing, 2003, XP-010643715, 12 pgs.
European Patent Office, "Communication Pursuant to Article 96(2) EPC," App. No. 04781256.3, dated Feb. 2, 2007, 4 pages.
Claims, App. No. 04781256.3, pp. 34-36.
Kokku, Ravi et al., "Half-Pipe Anchoring: An Efficient Technique for Multiple Connection Handoff," Proceedings of the 10th International Conference of Network Protocols, Nov. 12, 2002, 10 pages.
International Searching Authority, "Notification of Transmittal of the International Preliminary Report on Patentability," PCT/US2004/026445, dated Dec. 12, 2005, 6 pages.
Claims as Amended, PCT/US2004/026445, Aug. 11, 2005, 4 pages (attached).
European Patent Office, "International Preliminary Report on Patentability," Aug. 26, 2005, International Application No. PCT/US2004/026570, 9 pages.
International Searching Authority, "Notification of Transmittal of the International Search Report and the Written Opinion of the International Searching Authority, or the Declaration," Aug. 25, 2005, 12 pages.
Current Claims for International Application No. PCT/US2004/026445, pp. 1-5.
Henry Song, et al., "Browser State Repository Service," Lecture Notes in Computer Science, vol. 2414, 2002, pp. 1-14, XP002904339.
Eric Skow, et al., "A Security Architecture for Application Session Handoff," 2002, IEEE International Conference Proceedings, Apr. 28-May 2, 2002, vol. 1 of 5, pp. 2058-2063, XP010589848.
Chase, Jeffrey S., "Dynamic Virtual Clusters in a Grid Site Manager," Proceedings of the IEEE International Symposium on HPDC-2003, XP010463715, pp. 90-100.
International Searching Authority, "Notification of the Transmittal of the International Search Report and the Written Opinion of the International Searching Authority, or the Declaration", PCT/US2004/026405, dated Aug. 19, 2005, 5 pages.
Claims, PCT/US2004/026405, 7 pages.
Claims, App. No. 04781256.3, pp. 34-36, (Feb. 10, 2006).
"Office Action" received in U.S. Appl. No. 11/057,043 dated Apr. 9, 2008, 19 pages.
"Office Action" received in related case U.S. Appl. No. 10/917,661, filed Aug. 12, 2004, 9 pages.
"Office Action" received in related case U.S. Appl. No. 10/918,056, filed Aug. 12, 2004, 9 pages.
"Office Action" received in related case U.S. Appl. No. 10/917,687, filed Aug. 12, 2004, 9 pages.
European Patent Office, "Communication under Rule 71(3) EPC", Application No. 04781286.2-1244, dated Sep. 11, 2008, 6 pages.
Claims, Application No. 04781286.2-1244, dated Sep. 11, 2008, 40 pages.

* cited by examiner

HIERARCHICAL MANAGEMENT OF THE DYNAMIC ALLOCATION OF RESOURCES IN A MULTI-NODE SYSTEM

RELATED APPLICATIONS

The present application claims priority to U.S. Provisional Application No. 60/495,368, Computer Resource Provisioning, filed on Aug. 14, 2003, which is incorporated herein by reference; the present application claims priority to U.S. Provisional Application No. 60/500,096, Service Based Workload Management and Measurement in a Distributed System, filed on Sep. 3, 2003, which is incorporated herein by reference; the present application claims priority to U.S. Provisional Application No. 60/500,050, Automatic And Dynamic Provisioning Of Databases, filed on Sep. 3, 2003, which is incorporated herein by reference.

The present application is related to the following U.S. applications:

U.S. application Ser. No. 10/718,747, Automatic and Dynamic Provisioning of Databases, filed on Nov. 21, 2003, which is incorporated herein by reference;

U.S. application Ser. No. 10/917,953, Transparent Session Migration Across Servers, filed by Sanjay Kaluskar, et al. on the equal day herewith and incorporated herein by reference;

U.S. application Ser. No. 10/917,661, Calculation of Service Performance Grades in a Multi-Node Environment That Hosts the Services, filed by Lakshminarayanan Chidambaran, et al. on the equal day herewith and incorporated herein by reference;

U.S. application Ser. No. 10/918,055, Incremental Run-Time Session Balancing in a Multi-Node System, filed by Lakshminarayanan Chidambaran, et al. on the equal day herewith and incorporated herein by reference;

U.S. application Ser. No. 10/918,056, Service Placement for Enforcing Performance and Availability Levels in a Multi-Node System, filed by Lakshminarayanan Chidambaran, et al. on the equal day herewith and incorporated herein by reference;

U.S. application Ser. No. 10/917,687, On Demand Node and Server Instance Allocation and De-Allocation, filed by Lakshminarayanan Chidambaran, et al. on the equal day herewith and incorporated herein by reference;

U.S. application Ser. No. 10/918,054, Recoverable Asynchronous Message Driven Processing in a Multi-Node System, filed by Lakshminarayanan Chidambaran, et al. on the equal day herewith and incorporated herein by reference; and U.S. application Ser. No. 10/917,715, Managing Workload by Service, filed by Carol Colrain, et al. on the equal day herewith and incorporated herein by reference.

FIELD OF THE INVENTION

The present invention relates to work load management, and in particular, work load management within a multi-node computer system.

BACKGROUND OF THE INVENTION

Enterprises are looking at ways of reducing costs and increasing efficiencies of their data processing system. A typical enterprise data processing system allocates individual resources for each of the enterprise's applications. Enough resources are allocated up front for each application to handle the estimated peak load of the application. Each application has different load characteristics; some applications are busy during the day; some others during the night; some reports are run once a week and some others once a month. As a result, there is a lot of resource capacity that is left unutilized. Grid computing enables the utilization or elimination of this unutilized capacity. In fact, Grid computing is poised to drastically change the economics of computing.

A grid is a collection of computing elements that provide processing and some degree of shared storage; the resources of a grid are allocated dynamically to meet the computational needs and priorities of its clients. Grid computing can dramatically lower the cost of computing, extend the availability of computing resources, and deliver higher productivity and higher quality. The basic idea of Grid computing is the notion of computing as a utility, analogous to the electric power grid or the telephone network. A client of the Grid does not care where its data is or where the computation is performed. All a client wants is to have computation done and have the information delivered to the client when it wants.

This is analogous to the way electric utilities work; a customer does not know where the generator is, or how the electric grid is wired. The customer just asks for electricity and gets it. The goal is to make computing a utility—a ubiquitous commodity. Hence it has the name, the Grid.

This view of Grid computing as a utility is, of course, a client side view. From the server side, or behind the scenes, the Grid is about resource allocation, information sharing, and high availability. Resource allocation ensures that all those that need or request resources are getting what they need. Resources are not standing idle while requests are left unserviced. Information sharing makes sure that the information clients and applications need is available where and when it is needed. High availability ensures that all the data and computation must always be there—just as a utility company must always provide electric power.

Grid Computing for Databases

One area of computer technology that can benefit from Grid computing is database technology. A grid can support multiple databases and dynamically allocate and reallocate resources as needed to support the current demand for each database. As the demand for a database increases, more resources are allocated for that database, while other resources are deallocated from another database. For example, on an enterprise grid, a database is being serviced by one database server running on one server blade on the grid. The number of users requesting data from the database increases. In response to this increase, a database server for another database is removed from one server blade and a database server for the database experiencing increased user requests is provisioned to the server blade.

Grid computing for databases requires allocation and management of resources at different levels. At a level corresponding to a single database, the performance provided to the users of the database must be monitored and resources of the database allocated between the users to ensure performance goals for each of the users are met. Between databases, the allocation of a grid's resources between the databases must be managed to ensure that performance goals for users of all the databases are met. The work to manage allocation of resources at these different levels and the information needed to perform such management is very complex. Therefore, there is a need for a mechanism that simplifies and efficiently handles the management of resources in a Grid computing system for database systems as well as other types of systems that allocate resources at different levels within a Grid.

Approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for managing the allocation of resources in a multi-node environment is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein are approaches used for efficiently and effectively managing the dynamic allocation of resources of multi-node database systems between services provided by the multi-node database system. A service is work of a particular type or category that is performed for the benefit of one or more clients. The service includes any use or expenditure of computer resources, including, for example, CPU processing time, storing and accessing data in volatile memory, read and writes from and to persistent storage (i.e. disk storage), and use of network or bus bandwidth. A service may be, for example, work that is performed for a particular application on a client of a database server.

The approaches manage allocation of resources at different levels. For services that use a particular database, the performance realized by the services is monitored. Resources assigned to the database are allocated between these services to ensure performance goals for each are met. Resources assigned to a cluster of nodes are allocated between the databases to ensure that performance goals for all the services that use the databases are met.

The approach uses a hierarchy of directors to manage resources at the different levels. One type of director, a database director, manages resources allocated to a database among services that use a database and its database instances. The database director manages the allocation of database instances among the services. A cluster director manages resources of a cluster of nodes between databases whose database servers are hosted on the cluster. Yet another director, a farm director, manages resources allocated between clusters.

Figure 1:
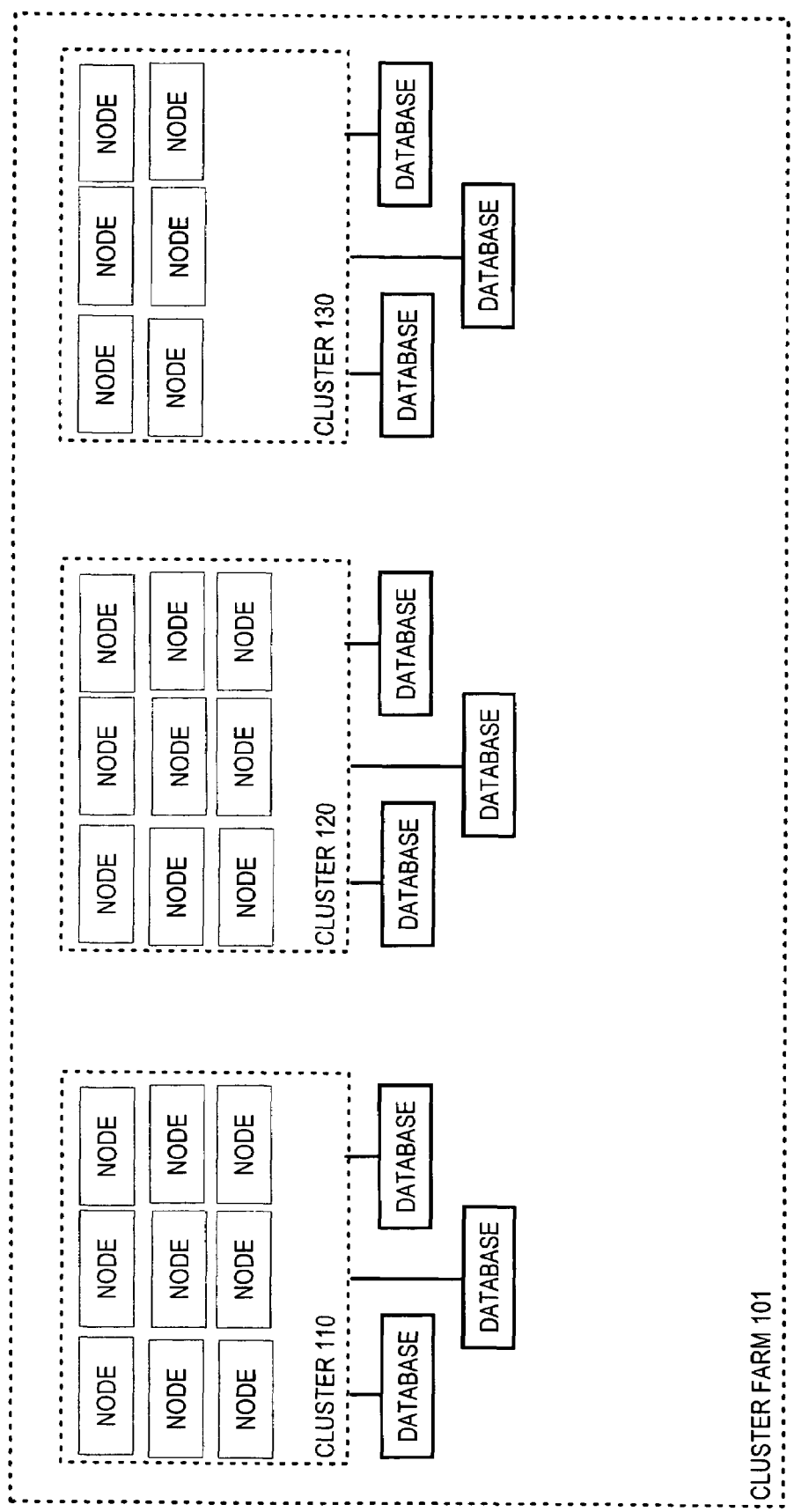
FIG. 1 is a block diagram showing a multi-node computer system on which an embodiment of the present invention may be implemented.

FIG. 1 shows a multi-node computer system that may be used to implement an embodiment of the present invention. Referring to FIG. 1, it shows cluster farm 101. A cluster farm is a set of nodes that is organized into groups of nodes, referred to as clusters. Clusters provide some degree of shared storage (e.g. shared access to a set of disk drives) between the nodes in the cluster.

The nodes in a cluster farm may be in the form of computers (e.g. work stations, personal computers) interconnected via a network. Alternately, the nodes may be the nodes of a grid. A grid is composed of nodes in the form of server blades interconnected with other server blades on a rack. Each server blade is an inclusive computer system, with processor, memory, network connections, and associated electronics on a single motherboard. Typically, server blades do not include onboard storage (other than volatile memory), and they share storage units (e.g. shared disks) along with a power supply, cooling system, and cabling within a rack.

A defining characteristic of a cluster in a cluster farm is that the cluster's nodes may be automatically transferred between clusters within the farm through software control without the need to physically reconnect the node from one cluster to another. A cluster is controlled and managed by software utilities referred to herein as clusterware. Clusterware may be executed to remove a node from a cluster and to provision the node to a cluster. Clusterware provides a command line interface that accepts requests from a human administrator, allowing the administrator to enter commands to provision and remove a node from a cluster. The interfaces may also take the form of Application Program Interfaces ("APIs"), which may be called by other software being executed within the cluster farm. Clusterware uses and maintains metadata that defines the configuration of a cluster within a farm, including cluster configuration metadata, which defines the topology of a cluster in a farm, including which particular nodes are in the cluster. The metadata is modified to reflect changes made to a cluster in a cluster farm by the clusterware. An example of clusterware is software developed by Oracle™, such as Oracle9i Real Application Clusters or Oracle Real Application Clusters 10g. Oracle9i Real Application Clusters is described in Oracle9i RAC: Oracle Real Application Clusters Configuration and Internals, by Mike Ault and Madhu Tumma, 2nd edition (Aug. 2, 2003).

Cluster farm 101 includes clusters 110, 120, and 130. Each of the clusters hosts one or more multi-node database servers that provide and manage access to databases.

Clusters and Multi-node Database Servers

Figure 2:
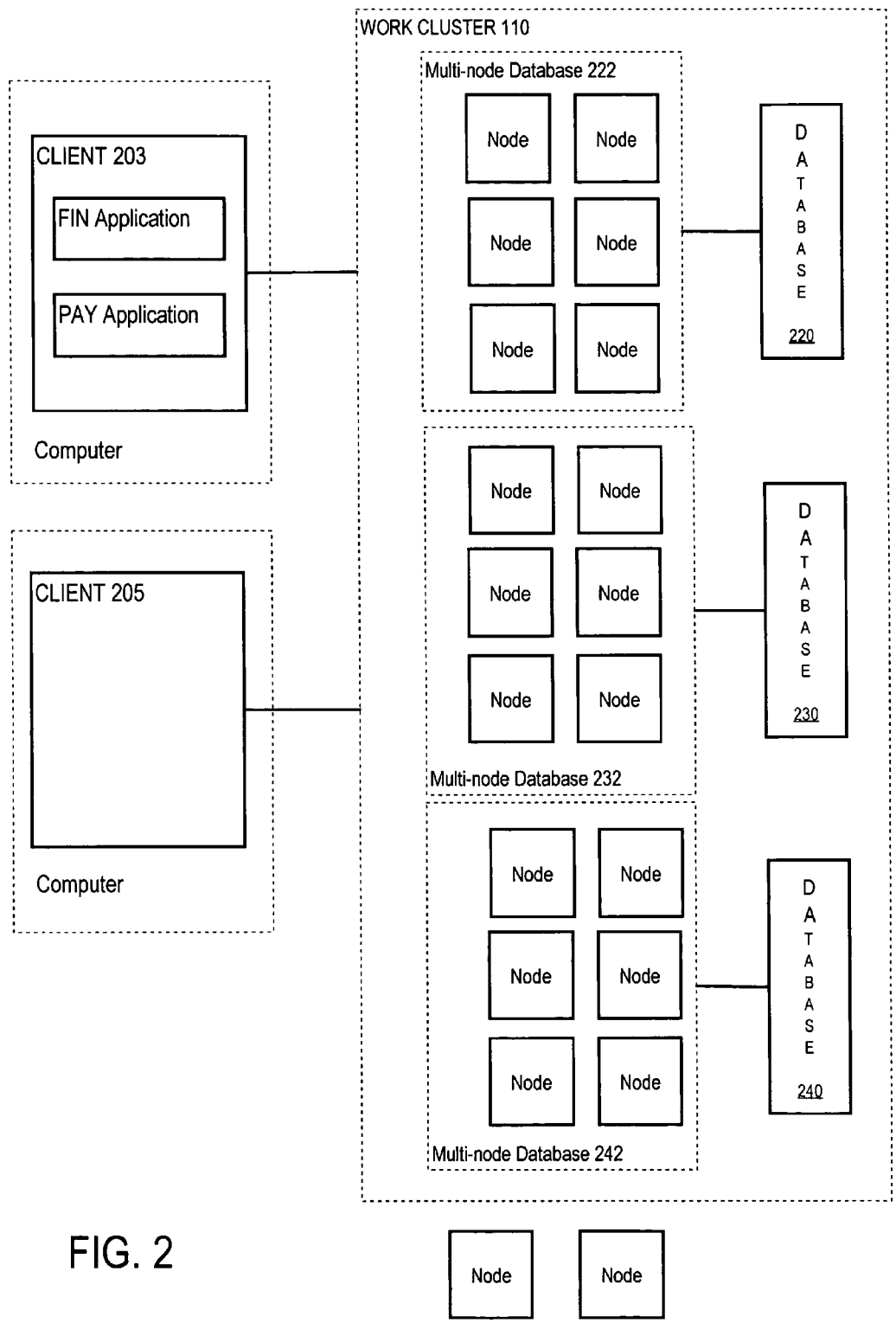
FIG. 2 is a block diagram showing a cluster of nodes according to an embodiment of the present invention.

FIG. 2 shows a cluster 110 according to an embodiment of the present invention. A defining feature of a cluster is that is it treated as a single unit or entity by clients of the cluster because the clients issue requests for services hosted by the cluster without specifying what particular node or nodes carryout the request, as shall be described in greater detail.

Cluster 110 includes multi-node database servers 222, 232, and 242. Multi-node database servers 222, 232, and 242 reside on one or more nodes of cluster 110. A server, such as a multi-node server, is a combination of integrated software components and an allocation of computational resources, such as memory, a node, and processes on the node for executing the integrated software components on a processor, where the combination of the software and computational resources are dedicated to performing a particular function on behalf of one or more clients. Among other functions of database management, a multi-node server governs and facilitates access to a particular database, processing requests by clients to access the database. Multi-node servers 222, 232, and 242 govern and provide access to database 220, 230, and 240, respectively. Another example of a server is a web server.

Resources from multiple nodes in a multi-node computing system can be allocated to running a server's software. Each combination of the software and allocation of the resources from a node is a server that is referred to herein as a "server instance" or "instance". Thus, a multi-node database server comprises multiple server instances that can run on multiple nodes. Several instances of a multi-node database server can in fact run on the same node. A multi-node database server comprises multiple "database instances", each database instance running on a node, and governing and facilitating access to a particular database. Hence, each instance can be referred to herein as a database instance of the particular database. Clusters are often used to host multi-node database servers.

Clients of cluster 110 as well as multi-node database servers 222, 232, and 242 include clients 203 and 205. Clients 203 and 205 execute applications on computers interconnected to cluster 110 via, for example, a network. An application, as the term is used herein, is a unit of software that is configured to interact with and use the functions of a server. In general, applications are comprised of integrated functions and software modules (e.g. programs comprised of machine executable code or interpretable code, dynamically linked libraries) that perform a set of related functions.

Clients 203, for example, include computer processes executing an FIN application and PAY application. The FIN application includes software that generates and analyzes accounting and financial information of an enterprise. The PAY application generates and tracks information about employee compensation of an enterprise.

The clients of database servers 222, 232, and 242 are not limited to computers interconnected to cluster 110 via a network. For example, database server 222 may be a client of database server 232.

A database, such as databases 220, 230, and 240, is a collection of database objects. Database objects include any form of structured data. Structured data is data structured according to a metadata description defining the structure. Structured data includes relational tables, object tables, object-relational tables, and bodies of data structured according to the Extensible Markup Language ("XML"), such as XML documents.

Sessions

In order for a client to interact with a database server on cluster 110, a session is established for the client. A session, such as a database session, is a particular connection established for a client to a server, such as a database instance, through which the client issues a series of requests (requests for execution of database statements). For each database session established on a database instance, session state data is maintained that reflects the current state of a database session. Such information contains, for example, the identity of the client for which the session was established, and temporary variable values generated by processes executing software within the database session.

A client establishes a database session by transmitting a database connection request to cluster 110.

A client of cluster 110, such as client 203 and 205, may interact with cluster 110 through client side interface components that reside on the same computer of the client. The client side interface components include API functions that are invoked by an application executed by clients 203 and 205. When a connection to a database server is assigned, connection information identifying the node is received by the client side interface components and used by them to transmit subsequent requests by the client to the node.

The database session assigned to a client may be migrated to another database instance. Migrating a database session entails creating a new database session on another node. While information about the migration and connection is transmitted to the client side interface components, the information is not accessible to the application and the application is "unaware" of the migration. In this way, the migration is performed transparently to the application. Requests that would be associated with the old database session are performed within the new database session. Techniques for migrating database sessions in this way are described in Transparent Session Migration Across Servers (50277-2383).

Services

As mentioned before, a service is work of a particular type or category that is performed for the benefit of one or more clients. Cluster 110 provides to clients 203 and 205 a database service for accessing database 220, a database service for accessing database 230, and a database service for accessing database 240. In general, a database service is work that is performed by a database server for a client, typically including work to process and/or compute queries that require access to a database. The term query as used herein refers to a database statement that conforms to a database language, such as SQL, and includes database statements that specify operations to add, delete, or modify data and create and modify database objects, such as tables, objects views, and executable routines.

Like any service, a database service may be further divided or categorized into subcategories. Database services for database 220 are further divided into the FIN service and PAY service. The FIN service is the database service performed by database server 222 for the FIN application. Typically, this service involves accessing database objects on database 220 that store database data for FIN applications. The PAY services are database services performed by database server 222 for the PAY application. Typically, this service involves accessing database objects on database 220 that store database data for PAY applications.

There are various ways in which work by a cluster may be divided or categorized in categories and subcategories of services, the present invention is not limited to any particular way. For example, the work may be divided into services based on users or groups of users (business enterprises, divisions within an enterprise) for which the work is performed.

Participants that Provide Services

Figure 3:
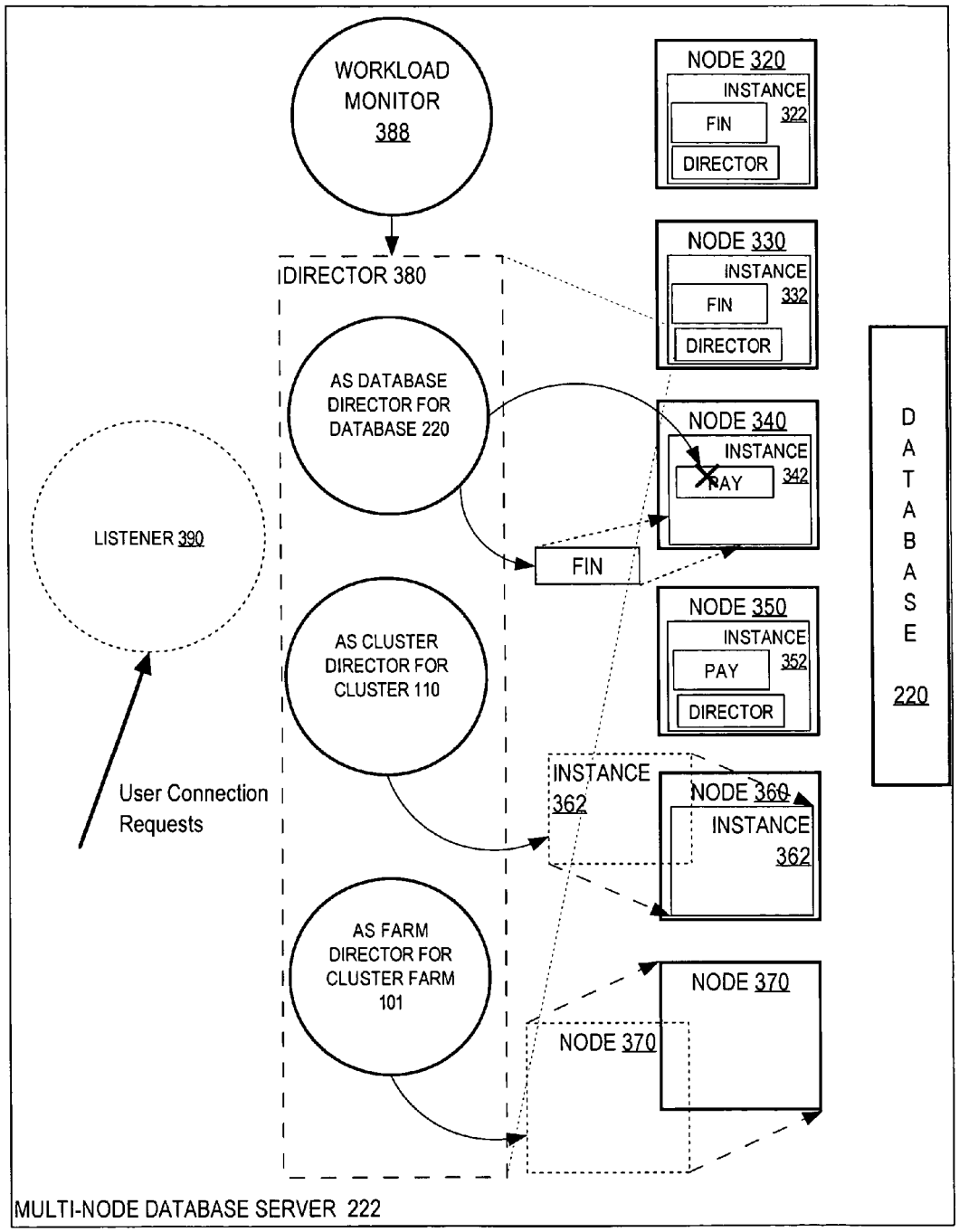
FIG. 3 is a block diagram showing components of a cluster of nodes and multi-node database server that participate in providing various services for a database according to an embodiment of the present invention.

FIG. 3 shows components of cluster 110 and multi-node database server 222 that participate in providing various services for database 220. Referring to FIG. 3, multi-node database server 222 includes database instances 322, 332, 342, 352, and 362, which reside on nodes 320, 330, 340, 350, and 360, respectively, and manage access to database 220. Database instances may be provisioned or removed from a particular node using an instance management application. Instance management applications are available, for example, as part of Oracle9i Real Application Clusters or Oracle Real Application Clusters 10g. Instance management applications provide command line interfaces or APIs that may be invoked by administrators or clients to provision or remove a database instance from a node.

Database instances of multi-node database server 222 have been allocated to a particular service. Database instances 322 and 332 have been allocated to service FIN. Database instances 342 and 352 have been allocated to service PAY. Instance 362 has not been allocated to any service. A service is referred to as running or residing on or being hosted by an instance, node, or cluster when the instance, node, or cluster has been allocated to perform the service. Thus, the FIN service is referred to as running or residing on database instances 322 and 332, and on nodes 320 and 330.

Listener 390 is a process running on cluster 110 that receives client database connection requests and directs them to a database instance within cluster 110. The client connection requests received are associated with a service. (e.g. service FIN, PAY) The client request is directed to a database instance hosting the service, where a database session is established for the client. As mentioned previously, the session may be migrated to another database instance. Listener 390 directs the request to the particular database instance and/or node in a way that is transparent to the application. Listener 390 may be running on any node within cluster 110. Once the database session is established for the client, the client may issue additional requests, which may be in the form of function or remote procedure invocations, and which include requests to begin execution of a transaction, to execute queries, to perform updates and other types of transaction operations, to commit or otherwise terminate a transaction, and to terminate a database session.

Monitoring Workload

Resources are allocated and re-allocated to meet levels of performance and cardinality constraints on the resources. Levels of performance and resource availability established for a particular service are referred to herein as service-level agreements. Levels of performance and cardinality constraints on resources that apply to a multi-node system in general and not necessarily to a particular service are referred to herein as policies. For example, a service-level agreement for service FIN maybe require as a level of performance that the average transaction time for service FIN be no more than a given threshold, and as an availability requirement that at least two instances host service FIN. A policy may require that the CPU utilization of any node should not exceed 80%.

Policies may also be referred to herein as backend policies because they are used by backend administrators to manage overall system performance and to allocate resources between a set of services when it is deemed there are insufficient resources to meet service-level agreements of all the set of services. For example, a policy assigns a higher priority to a database relative to another database. When there are insufficient resources to meet service-level agreements of services of both databases, the database with the higher priority, and the services that use the database, will be favored when allocating resources.

To meet service-level agreements, a mechanism is needed to monitor and measure workload placed on various resources. These measures of workload are used to determine whether service-level agreements are being met and to adjust the allocation of resources as needed to meet the service-level agreements.

A workload monitor, such as workload monitor 388, is a distributed set of processes that run on nodes of a cluster to monitor and measure workload of the cluster and generate "performance metrics". Workload monitor 388 runs on cluster 110. Performance metrics is data that indicates the level of performance for one or more resources or services based on performance measures. Approaches for performing these functions are described in Measuring Workload by Service (50277-2337). The information generated is accessible by various components within multi-node database server 222 that are responsible for managing the allocation of resources to meet service-level agreements, as shall be described in greater detail later.

A performance metric of a particular type that can be used to gauge a characteristic or condition that indicates a level of performance or workload is referred to herein as a performance measure. A performance measure includes for example, transaction execution time or percent of CPU utilization. In general, service-level agreements that involve levels of performance can be defined by thresholds and criteria that are based on performance measures.

For example, execution time of a transaction is a performance measure. A service-level agreement based on this measure is that a transaction for service FIN should execute within 300 milliseconds. Yet another performance measure is percentage CPU utilization of a node. A backend policy based on this measure is that a node experience no more than 80% utilization.

Performance metrics can indicate the performance of a cluster, the performance of a service running on a cluster, a node in the cluster, or a particular database instance. A performance metric or measure particular to a service is referred to herein as a service performance metric or measure. For example, a service performance measure for service FIN is the transaction time for transactions executed for service FIN.

Hierarchical Resource Allocation

Grid computing involves dynamically allocating computer resources to meet service-level agreements. In an embodiment, computer resources are balanced or adjusted at one or more levels of a resource allocation hierarchy. Each level of the hierarchy has a different set of resource pools that are allocated between uses (e.g. services). A resource pool is a group of resources of a particular type, for example, nodes and database instances that are available to a service, nodes that are available to a database or nodes that are available to a cluster. The three levels in the resource allocation are the database level, the cluster level, and the farm level.

Database Level

At the database level, the resources pools allocated are those currently being used for a particular database, including database instances of the database and nodes that host them. The resource pools of the database level (i.e. resources that can be allocated at the database level) are allocated between services of a database to meet service-level agreements. Generally, this involves placing services on instances and placing sessions on instances.

Sessions can be placed in several ways. The first way is referred to herein as connection-time balancing. Under connection-time balancing, listener 390 balances workload between service instances by directing database connection requests that require a particular service to an instance of database 220. For example, assume service FIN on database instance 322 is providing better service performance than other instances. Accordingly, listener 390 directs a greater portion of database connection requests requiring the FIN service to database instance 322.

The second way to place a session is referred to as run-time session balancing. Under run-time session balancing, database sessions are migrated from a database instance to another database instance. The database sessions are migrated using transparent session migration. As mentioned before, techniques for performing this are described in Transparent Session Migration Across Servers.

Service placement entails expanding and contracting services. Under service expansion and contraction, database instances are allocated to or deallocated from hosting services. When a database instance is assigned to host a service, more database sessions may be created for that service on that instance, thus increasing the number of database sessions associated with and available for the service. For example, to meet service-level agreements for service FIN, instances 322 and 332 are allocated to run service FIN. As demand for the service increases, the service-level agreements are no longer satisfied. When service-level agreements are not met, the service-level agreements are referred to as being violated. In response to this service-level violation, the FIN service is allocated an additional instance, instance 342. An instance can run more than one service. For purposes of illustration, an instance runs only one service. Thus, when FIN is added to instance 342, service PAY is "quiesced" from instance 342, that is, instance 342 is de-allocated as a resource that is used for the PAY service and the service on the instance is ceased.

Cluster Level

At the cluster level, resources that are currently allocated to a cluster are balanced between databases (i.e. database services) to meet service-level agreements. The resource pools balanced at this level are database instances and nodes hosting the database instances. Generally, balancing resources at this level involves provisioning and quiescing instances among existing nodes in the cluster. For example, to meet service-level agreements in response to a service-level violation, instance 362 is provisioned to node 360, a node already in the cluster for multi-node database server 222.

Farm Level

At this level the resources that can be allocated between services are the nodes in a cluster. The pool of nodes for a cluster is dynamic. For example, in response to a service-level violation, node 370 is added to the cluster of multi-node database server 222.

Hierarchy of Actions to Adjust Resource Allocation

In general, adjusting the resources at the lower level of the resource allocation hierarchy is less disruptive than at the higher levels. Migrating database sessions and services to and from running instances at the database level is less disruptive and costly than provisioning or quiescing a new database instance at the cluster level. It is less expensive to reshuffle the assigned resources amongst the entities to which the resources are already assigned than to request more resources to be assigned from a higher level. Service placement and session migration at the database level are less expensive than changing the number of database instances for the database at the cluster level. Within the database level, migrating sessions to reshuffle them between instances already hosting a service is less expensive than service expansion and contraction because the latter impacts the service topology and may have a greater overall impact on load distribution.

To remedy a service-level violation, resource allocations are adjusted beginning at the lowest levels of the resource allocation hierarchy. In this way, the service-level violations are in general remedied in a less disruptive and costly manner. Resort to a higher level of resource allocation is not made if a service-level violation may be solved by adjusting resource allocations at the database level. Some service-level violations require adjustments at some or all levels.

For example, in response to a service-level violation, FIN is provisioned to instance 352 and PAY is quiesced from the same instance, but only if quiescing service PAY does not violate service-level agreements for PAY. Otherwise, service FIN is expanded to another database instance. However, if there is no available instance to which to provision service FIN, then a new instance is provisioned. This is done by making allocation at the cluster level, provisioning a new instance 362 to node 360, a node already in the cluster. Then, an allocation may be made at the database level by expanding service FIN to instance 362, which at the time the service is provisioned, is an instance already allocated to database 220.

Hierarchy of Directors

According to an embodiment, a distributed system component, referred to as a distributed director, is responsible for managing workload of resources and resource allocation at each of the levels. As the term is used herein, a system component is a combination of software, data, and one or more processes that execute that software and that use and maintain the data to perform a particular function. A distributed system component is executed on multiple nodes. Preferably, but not necessarily, a director is a system component of a database instance and is operating under the control of the database instance. A distributed director includes directors executed on multiple nodes of cluster farm 101.

According to an embodiment, a director is responsible for managing the allocation of resources at one or more levels of the resource allocation hierarchy. Specifically, for each database, a director serves as a database director managing the allocation of resources at the database level. Other database instances of the database may have directors that serve as standby database directors, readying to take over as an "active" database director if the current active database director becomes unable to perform this role due to, for example, a system failure.

For each cluster, a director serves as the cluster director. The cluster director is responsible for managing allocation of resources at the cluster level for a cluster. Other directors within the cluster serve as standby cluster directors.

Finally, a director serves as the farm director. The farm director is responsible for managing the allocation of resources at the farm level. Other directors within the cluster serve as standby farm directors.

A director receives, maintains, and generates information needed to manage workload at that director's corresponding level.

Referring to FIG. 3, director 380 is running on database instance 342. Director 380 serves as database director for database 220, cluster director for cluster 110, and farm director for cluster farm 101. Other directors act as a database director for databases 230 and 240, respectively, and as a cluster director for clusters 120 and 130, respectively.

In general, to resolve a service-level violation, directors at all levels of the resource allocation hierarchy may participate to remedy the violation. A database director attempts to remedy a service-level violation by adjusting the allocation of resources at the database level. If the service-level violation requires an adjustment at the next higher level of the resource allocation hierarchy, the cluster level, the database director escalates the resolution of the service-level violation to the cluster director. If the service-level violation requires an adjustment at the highest level of the resource allocation hierarchy, the farm level, the cluster director escalates the resolution of the service-level violation to the farm director. A remedy to a service-level violation may involve an adjustment of resource allocation by all directors.

Directors communicate to each other using a messaging queue. According to an embodiment, the message queue is a table stored in the database of the database instance hosting the director. The records or rows of the table correspond to a message queue. The record indicates the status of any action taken in response to a message by the director responsible for responding to messages of that type. For example, the database director may request a database instance from the cluster director. The request is added to the queue. The cluster director scans the message queue, detects the request, and acts upon it, updating the record to reflect actions undertaken to respond to the request. The cluster director sends a message to the database director, which is placed in the message queue of the database director.

The advantage of using a table in database 220 is that it makes available the power and capability of a transaction oriented database system, such as multi-node database server 222, to store the message queue persistently and recoverably. When the active database, cluster, or farm director fails, the standby director stepping in its place can access the message queue in a state consistent with the way the director left it when it failed. Such a message queue and the use of it are described in Recoverable Asynchronous Message Driven Processing in a Multi-Node System (50277-2414).

Database Director

The database director is responsible for monitoring service performance of services to ensure service-level agreements are met, expanding or contracting services from database instances of a database 220, and for migrating database sessions between database instances of database 220. The database director also has access to and stores service performance metrics and service-level agreements for each service using the database. Based on these service performance metrics and service-level agreements, the database director ensures service-level agreements are met in two ways—(1) maintaining service performance compliance with service-level agreements by generating and sending information to the listener that allows the listener to balance workload between service instances; and (2) remedying service-level violations by detecting them and initiating adjustments to resource allocations in order to remedy the service-level violations.

To maintain service performance compliance with service-level agreements, connection-time balancing is used. Specifically, the director 380 generates and provides information, referred to herein as performance grades, to listener 390. Performance grades guide listener 390 in balancing workload to maintain service performance compliance. Performance grades indicate relative service performance of a service on an instance relative to other instances. Based on the performance grades, listener 390 skews the distribution of connection user requests for the service to database instances providing better service performance. Techniques for generating performance grades and distributing user requests in this way based on performance grades are described in Calculation of Service Performance Grades in a Multi-Node Environment That Hosts the Services (50277-2410).

Remedying a service-level violation requires detecting the service-level violation. Director 380 detects a service-level violation for a service by comparing service performance metrics to service-level agreements. For example, director 380 receives from workload monitor 388 service performance metrics that indicate that the average transaction time for service FIN exceeds 30 milliseconds. A service-level agreement for service FIN requires that average transaction time be no more than 20 milliseconds. By comparing the actual average transaction time to the service-level agreement, director 380 detects a service-level violation.

When the database director detects a service-level violation for a service, it attempts the least disruptive and costly resource allocation adjustments before attempting the more disruptive and costly resource allocation adjustments, in accordance with the resource allocation hierarchy. To this end, database director first determines whether it may remedy the service-level violation by balancing the workload between instances already hosting a service by migrating database sessions allocated to the service to another database instance where the service performance is better. The number of database sessions migrated is chosen in a way that is targeted to achieve a balanced load between the service instances.

If the database director determines that a service-level violation should not be solved by rebalancing load between existing service instances, director 380 attempts to remedy the service-level violation by expanding a service, i.e. by allocating another existing database instance to host the service, referred to herein as the target database instance. If the target database instance is not hosting a service, the service is expanded by allocating the target database instance to host the service. If the target database instance hosts another service, the database director may quiesce the service if the database director determines that doing so will not cause a service-level violation for the other service.

Figure 4:
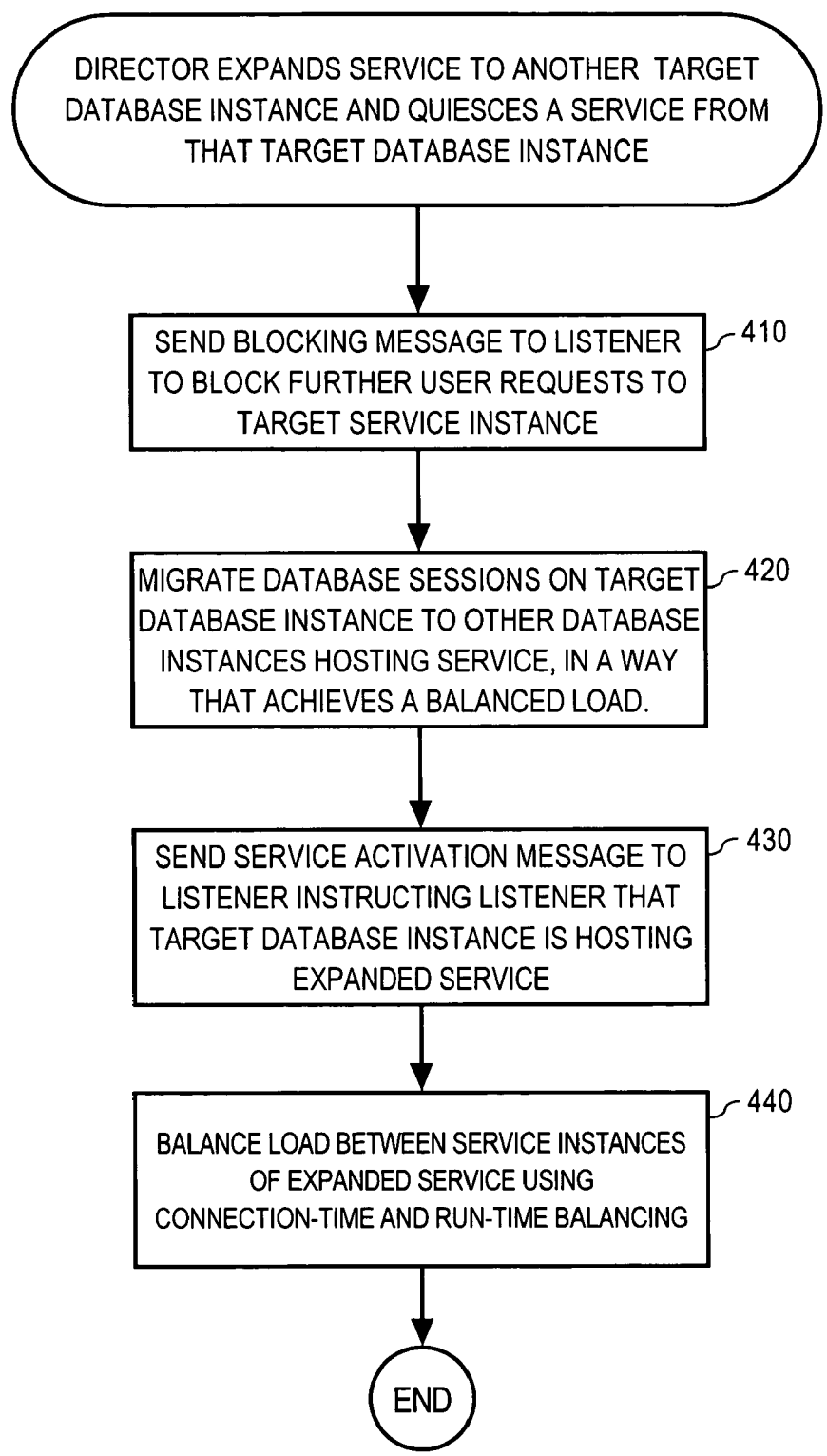
FIG. 4 is a flow chart showing a procedure for expanding a service to a target database instance and quiescing a service on the target database instance.

FIG. 4 depicts a flowchart of a process followed by director 380, as database director for database 220, to expand a service to an additional database instance ("target database instance") when a service on the target database instance must first be quiesced. For purposes of illustration, service PAY is hosted by database instances 342, 352, and 362, the latter being on node 360. Service FIN is being expanded to database instance 342. The service instance of service PAY running on instance 342 is being quiesced.

Referring to FIG. 4, at step 410, director 380 sends a blocking message to listener 390. The blocking message instructs listener 390 to cease distributing user requests for service PAY to target database instance 342.

At step 420, database director 380 migrates database sessions on a target database instance to the other database instances hosting service FIN. The database sessions are distributed between the other database instances in a way that balances workload between them.

At step 430, director 380 sends a service activation message to listener 390. The service activation message instructs listener 390 that service FIN is running on instance 362.

At step 440, director 380 uses run-time balancing to balance the workload between instances on which service FIN is running (i.e. instances 322, 332, 342).

In some cases, director 380 may determine that no service can contract to make room for the expansion of another service without violating service-level agreements on a target instance. In this case, director 380 may chose to expand the service to a database instance not yet hosting any service. If no database instance is available, director 380 requests one from the cluster director. In response, the cluster director provisions another database instance as requested, and notifies director 380. Director 380 expands the service to the new database instance.

Service-level agreements may limit the cardinality of a service. For example, service-level agreements for service FIN require that at least one but no more than three database instances host service FIN, and that service PAY be hosted by at least three database instances.

A service may be quiesced for reasons other than to make a database instance available for expansion of another service. For example, cardinality constraints for service FIN may vary based on the time of the day. During normal business hours, the cardinality of service FIN may be as high as three but during non-business hours, cardinality may be no higher than one. At the start of non-business hours, three database instances are hosting service FIN. Database director 380 contracts service FIN by quiescing the service on two of the database instances.

A database director may need to respond to requests made by a cluster director. Such actions include responding to requests by the cluster director to quiesce a database instance, that is, quiesce the services currently hosted by a database instance. This step is needed when the cluster director wishes to replace a database instance for a database with a database instance for another database.

Cluster Director

The cluster director is responsible for provisioning and removing database instances from existing nodes in the cluster. The cluster director also enforces database level policies. Database level policies require, for example, that the cardinality of database instances for a database fall within a minimum and/or maximum, or require that when there are insufficient resources to meet all service-level agreements, that the cluster director skew the allocation of database instances to databases designated as having a higher priority for resource allocation. Skewing between databases in this way also skews the allocation of resources to services using the higher prioritized databases. The cluster director has access to and stores data specifying the priority for resource allocation between databases. Such data may be configured by an administrator of a cluster.

The cluster director provisions and removes database instances in response to a database director's request for a database instance ("NEED-INSTANCE" request). If there is a node within the cluster that is not hosting a database instance (a "free node"), then the cluster director allocates another node to the database by provisioning a database instance to the free node.

If there is no free node in the cluster, cluster director may request one from the farm director by issuing a "NEED-NODE" request to the farm director. If the farm director is unable to provide one, then the cluster director arbitrates allocation of database instances between databases hosted by the cluster. The arbitration may entail removing a database instance of a database from a node in a cluster and provisioning a database instance for the database for which the NEED-INSTANCE request was generated.

Figure 5:
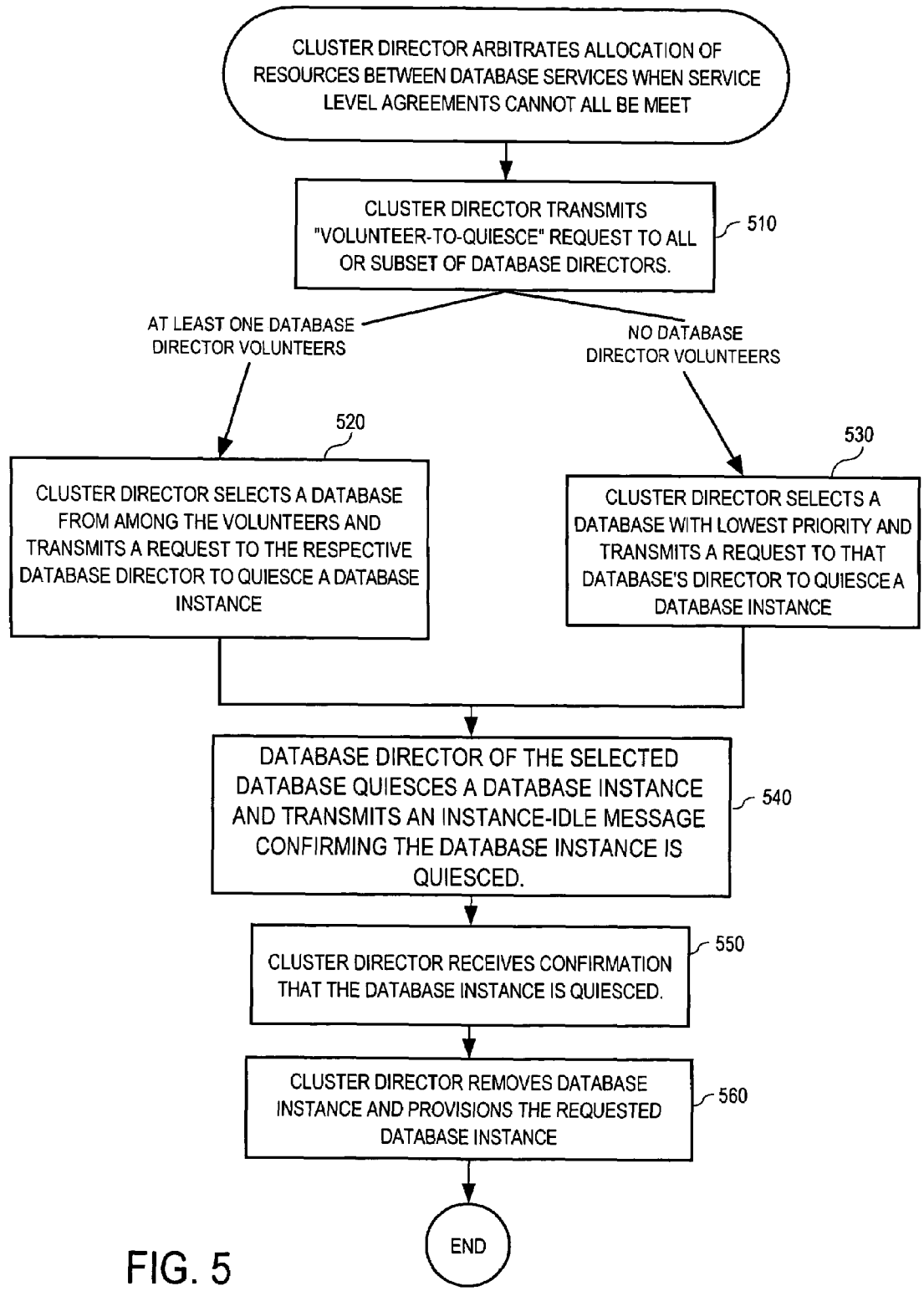
FIG. 5 is a flow chart showing the procedure for two-phase-quiescing.

FIG. 5 is a flow chart depicting a process for arbitrating the allocation of database instances between databases. The database director for database 220, has determined that another database instance is needed for a service, and has generated a NEED-INSTANCE request for the cluster director, which is director 380. Director 380, in its capacity as cluster director, determines that a database instance for another database should be removed from a node within cluster 110 so that the node may be used to provision another database instance for database 220.

Referring to FIG. 5, at step 510, director 380, as cluster director, transmits a "VOLUNTEER-TO-QUIESCE" request to database directors other than the requesting database director (i.e. the director issuing the NEED-INSTANCE request). The purpose of the VOLUNTEER-TO-QUIESCE request is to ask a database director whether it may quiesce a database instance i.e. may reduce the cardinality of database instances for the director's database. A database director of a database may respond by volunteering, transmitting a message indicating that a database instance for the database may be quiesced. A database director may decline to quiesce a database instance i.e. reduce the cardinality of database instances. One reason a database director may send a message declining the request is that all the director's database instances are needed to satisfy availability requirements for a service.

If database director 380 receives at least one message from a database director affirming that a database instance may be quiesced, that is, more than one database director volunteers, then at step 520, director 380 selects a database from among those who volunteered. A database with a lower resource allocation priority may be selected in favor of a database with a higher resource allocation priority. For purposes of illustration, director 380 selects database 240. The cluster director 384 sends a message to the database director of database 240 to quiesce a database instance of database 240 from a node hosting the database instance.

If database director 380 receives no message from a database director affirming that a database instance may be quiesced, that is, no database director volunteers, then at step 530, director 380 selects a database with a lower resource allocation priority. Director 380 then transmits a message to the database director of the selected database to quiesce a database instance. Techniques for selecting a database instance to quiesce are described in further detail in On Demand Node and Server Allocation and Deallocation (50277-2413).

At step 540, the database director of database 240 quiesces a database instance on the node and transmits a notification to the cluster director, director 380, that the database instance is quiesced ("INSTANCE-IDLE" notification). At step 550, director 380 receives the notification.

At step 560, cluster director 380 removes the database instance from the node and provisions a database instance for database 230 to the node, using, for example, instance provisioning APIs of clusterware.

As a result of arbitrating the allocation of database instances between databases, the services offered by the database relinquishing the node may experience service-level violations. The cardinality of nodes in the cluster may be increased, as shall be explained in greater detail, and thus free nodes may become available and may be used to remedy such service-level violations. Director 380, as cluster director, monitors cluster configuration metadata to detect when more free nodes become available, and may allocate them to a database incurring service-level violations. For example, in the current example, the database director for database 220, after relinquishing the database instance, continues to detect service-level violations, and, in response, transmits NEED-INSTANCE requests to its cluster director, director 380. Eventually, after detecting that more free nodes have been added to cluster 110, director 380 is able to respond to one of the requests by provisioning a database instance to the free node.

Farm Director

The farm director is responsible for allocating nodes between clusters in a cluster farm, shuffling nodes between them by removing a node from one cluster and provisioning the node to another cluster. The cluster director also enforces cluster-wide policies. Cluster-wide policies may require, for example, that the cardinality of nodes within a cluster fall within a minimum and/or maximum.

In response to a NEED-NODE request from a cluster director, a farm director provisions a node to a cluster and removes a free node from another cluster, subject to cluster service-level agreements. A farm director corresponds with the cluster directors in a cluster farm to arbitrate the allocation of a node. This process entails transmitting a "RELINQUISH-NODE" request to the cluster directors, who respond to indicate whether or not they may relinquish a node. Based on the responses, the farm director selects a cluster and interacts with the cluster director of the selected cluster to remove the node from the cluster. Removing the node from the cluster may entail quiescing a database instance. Once the database instance is quiesced, a farm director removes the node from the selected cluster and provisions the node to the cluster needing the node by invoking clusterware using APIs provided for this purpose.

In addition, a farm director monitors the performance of clusters in the cluster farm using the performance metrics received from workload monitors executing on each of the clusters. If performance metrics indicate that a cluster is performing in violation of service-level agreements for the cluster or is not performing as well as the other cluster, then the farm director shifts one or more nodes from a better performing cluster to the worse performing cluster.

Election of Directors

As mentioned before, within the database instances of a database, there are multiple directors that may serve as the active database director or standby director. Therefore, there is a need for a mechanism to determine which director is the active director. Furthermore, when the active director fails, there is a need to select a standby database director to be the active database director. The same kind of need exists for the cluster directors and farm director. The process of selecting an active director is referred to herein as director election.

There are various ways in which database directors may be elected. The first involves the use of a database global lock. A database global lock is used to synchronize processes running under control of all the database instances of a database. Upon startup, a database director requests an exclusive lock. If no database director holds the lock, then the database director is granted the lock and assumes the position of database director. Other directors who subsequently request the lock are not granted the lock and assume the position of standby director until the lock is granted, if at all. The requests remain pending until granted or rescinded by the requestor.

Multi-node database servers detect when the holders of a database global lock experience system failure. In this case, the database global lock of a failed holder is cancelled or released and a pending request for the database global lock is granted to a standby database director. The standby database director whose lock is granted then assumes the role of database director.

Another technique for director election involves the use of process groups. A process group is a group that may be joined by processes executing on any node within a cluster. Members of the group are informed when another member stops running (e.g. due to system failure) or leaves the process group. In addition, members are assigned an id when joining the group.

When a director starts up, it joins a process group for its database. If upon joining a director has the highest member id, the director assumes the position of database director for the database. When the active director stops running, the members of the process group are informed and the one with the highest member id assumes the role of database director.

Similar techniques may be used for election of cluster directors. A cluster-wide lock may be used for director election or a process group for a cluster may be used.

Under these techniques, it is possible that the director that assumes the cluster director role may be a director for a database different than that of the previous active cluster director. Consequently, the message queue may reside on a different database. Tables on a database may be accessed more efficiently by processes residing on database instances for the database than processes residing on a database instance of another database.

A technique that can be used is to ensure that the standby director assuming the role of an active director is hosted by a database instance for the same database is the static data designation technique. Under this technique, a database is designated as the one that hosts (i.e. whose database instances host) the cluster director for a cluster. Only directors for that database play the role of cluster director for a cluster. Director election among these directors may be performed using either a global database lock or a process group for the database.

The database may be designated by an administrator using an interface provided by clusterware for this purpose. To enhance standby cluster director availability, a database with high priority and high minimum/maximum cardinality requirements can be designated, ensuring a relatively large number of standby directors. The static database designation approach may be used to elect an active farm director.

Organizing the management of resources within a farm cluster using the hierarchy of directors facilitates the generation and exchange of information needed to manage the resources. In general, processes running within a particular database (i.e. processes of a database instance for a particular database) are able to communicate with other processes within the database more efficiently than processes not within the database. Thus, a director that is serving as a database director for a database, and that obtains service performance metrics from one or more work load monitors running within the database, is able to obtain that data more efficiently than directors running within other databases. In addition, since there is only one database director active within a database, the work of getting and generating information for the services running a database, such as service performance metrics, service-level agreements, message queue data, need only be performed by one director.

Similarly for a cluster director, only one director within the cluster need perform the work of accessing the message queue and getting cluster service-level agreements and information needed to track which nodes are in the cluster, and what database instances of what database the nodes are hosting.

The way the information and information exchange is distributed is used to define the actions a director can itself take to manage service performance and which actions the director escalates or delegates to another director. For example, reallocating database instances between databases requires knowing such information as what nodes are available in the cluster, and what nodes have what database instances. Therefore, when a database director, which does not know such information, detects a service-level violation that requires action in the form of reallocation of database instances between databases, the database director escalates the action to the cluster director, which knows such information.

EXAMPLES OF ALTERNATE EMBODIMENTS

An embodiment of the present invention has been illustrated by dynamically allocating the resources of a multi-node system among database services and subcategories of database services. However, the present invention is not so limited.

For example, an embodiment of the present invention may be used to allocate computer resources of a multi-node system that hosts an application server among services provided by the application server. An application server is part of, for example, a three tier architecture in which an application server sits between clients and a database server. The application server is used primarily for storing, providing access to, and executing application code, while a database server is used primarily for storing and providing access to a database for the application server. The application server transmits requests for data to the database server. The requests may be generated by an application server in response to executing the application code stored on the application server. An example of an application server is Oracle 9i Application Server or Oracle 10g Application Server. Similar to examples of a multi-node server described herein, an application server may be distributed as multiple server instances executing on multiple nodes, the server instances hosting multiple sessions that may be migrated between the server instances.

The present invention is also not limited to homogenous multi-node servers comprised only of server instances that execute copies of the same software product or same version of a software product. For example, a multi-node database server may be comprised of several groups of server instances, each group executing different database server software from a different vendor, or executing a different version of database server software from the same vendor.

Hardware Overview

Figure 6:
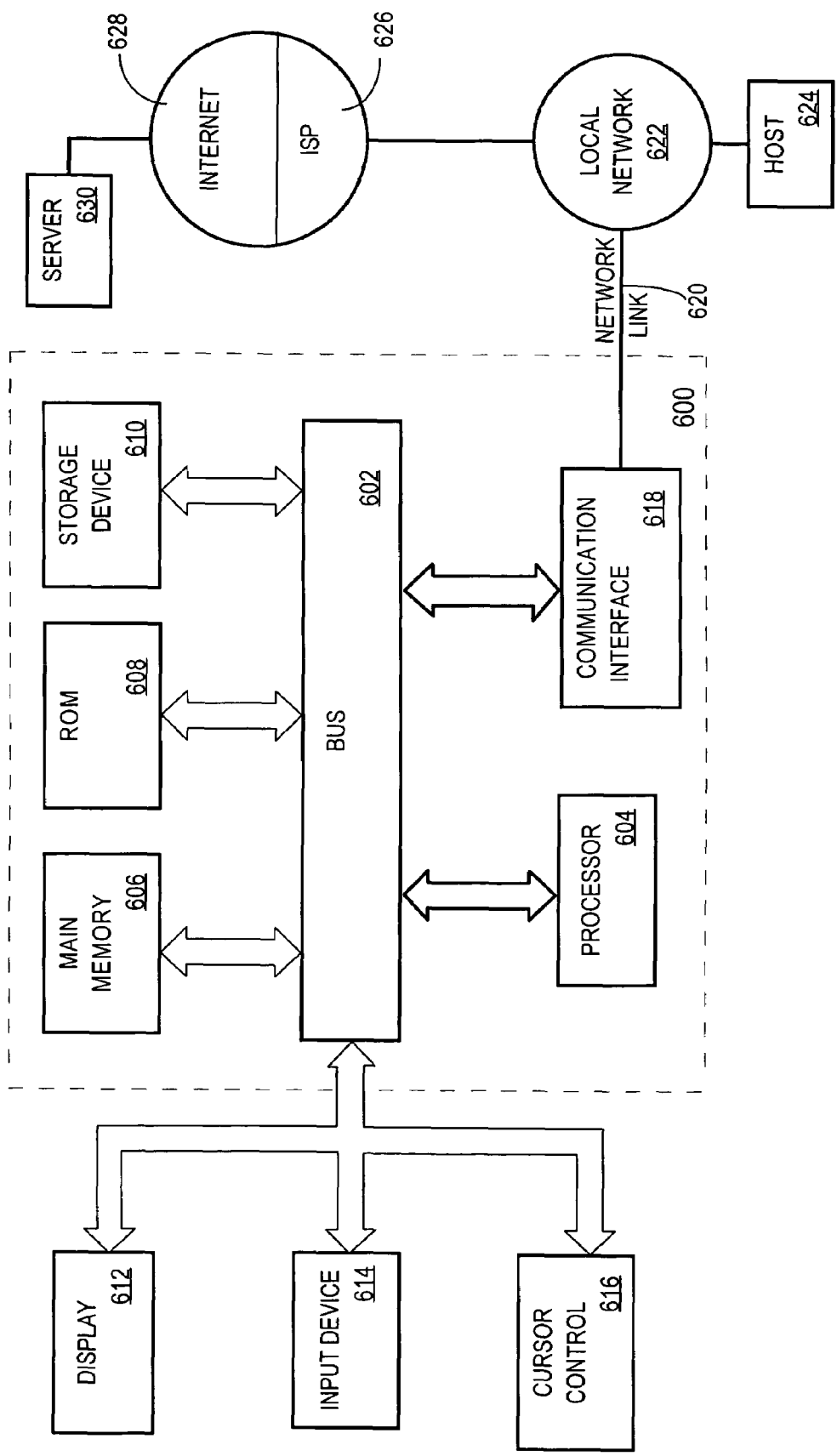
FIG. 6 is a block diagram of a computer system that may be used in an embodiment of the present invention.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for dynamically allocating computer resources of a multi-node computer system, the method comprising computer implemented steps of:
    monitoring performance realized by a plurality of services running on the multi-node computer system, wherein said plurality of services includes a first service and a second service;
    based on said monitoring the performance of a plurality of services, generating performance metrics that indicate performance realized by each service of said plurality of services;
    based on the performance metrics, said multi-node computer system detecting a violation of service-level agreements for said first service;
    in response to detecting said violation of said service-level agreements, said multi-node computer system adjusting allocation of computer resources of said multi-node system between said first service and said second service;
    said computer resources containing pools of resources;
    the step of adjusting allocation of computer resources includes attempting to resolve said performance violation by adjusting, for said first service, allocation of a first pool of resources that is lower in a hierarchy before attempting to adjust allocation of a second pool of resources that is higher in said hierarchy.

2. The method of claim 1, wherein the step of adjusting allocation of resources includes allocating another node of said multi-node system to host said first service.

3. The method of claim 1, wherein a first server runs on a first node of said multi-node system, wherein the step of adjusting allocation of resources includes expanding said first service to said first server.

4. The method of claim 3, wherein adjusting allocation of resources includes provisioning said first server to said first node to perform the step of expanding said first service to said first server.

5. The method of claim 1, wherein:
    said multi-node system includes a first node and a second node;
    a first group of sessions are established for said first service on said first node;
    a second group of sessions are established for said first service on said second node; and
    the step of allocating resources includes migrating at least one session from said second group to said first node.

6. The method of claim 1, wherein:
    the pools of resources include a first pool of servers as said first pool of resources and a second pool of nodes as said second pool of resources; and
    the step of attempting to resolve said performance violation includes attempting to allocate another server from said first pool to host said first service before attempting to add another node from said second pool to host said first service.

7. The method of claim 6, wherein the steps further include, in response to adding said another node, provisioning another server to said another node.

8. The method of claim 1, wherein:
    the first multi-node server includes a first server, a second server, and a third server;
    the first server hosts a plurality of sessions for said first service; and
    the step of attempting to resolve said performance violation includes attempting to migrate at least one of said plurality of sessions to said second server before allocating said third server to host said first service.

9. The method of claim 1, wherein:
    each service of said plurality of services is a category of work performed by said multi-node system; and
    the step of adjusting allocation of computer resources of said multi-node system includes adjusting allocation of computer resources to each category of said plurality of category of work.

10. The method of claim 9, wherein:
    a plurality of units of software execute on a set of client computers interconnected to said multi-node system; and
    each category of work corresponds to a particular unit of software from said plurality of units.

11. The method of claim 10, wherein each category of work corresponds to work performed in response to a request generated by a certain particular unit of software from said plurality of units.

12. A method for dynamically allocating computer resources of a multi-node computer system that includes a first set of nodes and a second set of nodes, the method comprising the steps of:
    monitoring performance of a plurality of services hosted on said multi-node system to generate performance metrics;
    based on said monitoring the performance of a plurality of services, generating performance metrics that indicate performance realized by each service of said plurality of services;
    wherein said multi-node system includes a first set of nodes and a second set of nodes;
    running a first multi-node server and a second multi-node server on said first set of nodes;
    wherein said plurality of services includes a first service and a second service hosted by said first multi-node server;
    a first system component running on said first set of nodes adjusting an allocation of computer resources of the first multi-node server between said first service and said second service based on said performance metrics; and a second system component running on said first set of nodes adjusting an allocation of computer resources of the first set of nodes between said first multi-node server and said second multi-node server based on said performance metrics.

said computer resources containing pools of resources;

the step of adjusting allocation of computer resources includes attempting to resolve said performance violation by adjusting, for said first service, allocation of a first pool of resources that is lower in a hierarchy before attempting to adjust allocation of a second pool of resources that is higher in said hierarchy.

13. The method of claim 12, wherein the steps further include:

the first system component detecting a service-level violation for said first service; and in response to detecting the service-level violation for said first service, said first system component transmitting a first request to said second system component to adjust the allocation of resources of the first set of nodes between said first multi-node server and said second multi-node server.

14. The method of claim 12, wherein said second system component adjusting an allocation of resources of the first set of nodes between said first multi-node server and said second multi-node server includes said second system component allocating nodes between said first multi-node server and said second multi-node server.

15. The method of claim 12, the steps further include:

the first system component detecting a service-level violation for said first service; and in response to detecting the service-level violation for said first service, the first system component adjusting allocation of resources of the first multi-node server between said first service and said second service.

16. The method of claim 15, wherein:

the first multi-node server includes a first server instance and a second server instance; and wherein the step of adjusting allocation of resources of the first multi-node server includes causing said second server to host said first service.

17. The method of claim 15, wherein:

the first multi-node server includes a first server instance and a second server instance;

the first server instance hosts at least one session for said first service;

the second server instance hosts at least one session for said first service; and the step of adjusting allocation of resources of the first multi-node server includes adjusting the balance of sessions for said first service between said first server instance and said second server instance.

18. The method of claim 13, wherein in response to receiving said first request, said second system component provisioning another server instance of the first multi-node server to another node.

19. The method of claim 18, wherein:

the first set of nodes is a first cluster of nodes that share access to at least one persistent storage device;

the second system component transmits a second request to a third system component running on the multi-node system to request another node; and the third system component allocates nodes between the first cluster and another cluster within the multi-node system based on said performance metrics.

20. The method of claim 18, wherein provisioning another server instance causes said second system component to transmit a message to said first system component to indicate said another server instance is available.

21. A computer-readable storage medium storing one or more sequences of instructions which, when executed by one or more processors, causes the one or more processors to perform the method recited in claim 1.

22. A computer-readable storage medium storing one or more sequences of instructions which, when executed by one or more processors, causes the one or more processors to perform the method recited in claim 2.

23. A computer-readable storage medium storing one or more sequences of instructions which, when executed by one or more processors, causes the one or more processors to perform the method recited in claim 3.

24. A computer-readable storage medium storing one or more sequences of instructions which, when executed by one or more processors, causes the one or more processors to perform the method recited in claim 4.

25. A computer-readable storage medium storing one or more sequences of instructions which, when executed by one or more processors, causes the one or more processors to perform the method recited in claim 5.

26. A computer-readable storage medium storing one or more sequences of instructions which, when executed by one or more processors, causes the one or more processors to perform the method recited in claim 6.

27. A computer-readable storage medium storing one or more sequences of instructions which, when executed by one or more processors, causes the one or more processors to perform the method recited in claim 7.

28. A computer-readable storage medium storing one or more sequences of instructions which, when executed by one or more processors, causes the one or more processors to perform the method recited in claim 8.

29. A computer-readable storage medium storing one or more sequences of instructions which, when executed by one or more processors, causes the one or more processors to perform the method recited in claim 9.

30. A computer-readable storage medium storing one or more sequences of instructions which, when executed by one or more processors, causes the one or more processors to perform the method recited in claim 10.

31. A computer-readable storage medium storing one or more sequences of instructions which, when executed by one or more processors, causes the one or more processors to perform the method recited in claim 11.

32. A computer-readable storage medium storing one or more sequences of instructions which, when executed by one or more processors, causes the one or more processors to perform the method recited in claim 12.

33. A computer-readable storage medium storing one or more sequences of instructions which, when executed by one or more processors, causes the one or more processors to perform the method recited in claim 13.

34. A computer-readable storage medium storing one or more sequences of instructions which, when executed by one or more processors, causes the one or more processors to perform the method recited in claim 14.

35. A computer-readable storage medium storing one or more sequences of instructions which, when executed by one or more processors, causes the one or more processors to perform the method recited in claim 15.

36. A computer-readable storage medium storing one or more sequences of instructions which, when executed by one or more processors, causes the one or more processors to perform the method recited in claim 16.

37. A computer-readable storage medium storing one or more sequences of instructions which, when executed by one or more processors, causes the one or more processors to perform the method recited in claim 17.

38. A computer-readable storage medium storing one or more sequences of instructions which, when executed by one or more processors, causes the one or more processors to perform the method recited in claim 18.

39. A computer-readable storage medium storing one or more sequences of instructions which, when executed by one or more processors, causes the one or more processors to perform the method recited in claim 19.

40. A computer-readable storage medium storing one or more sequences of instructions which, when executed by one or more processors, causes the one or more processors to perform the method recited in claim 20.

* * * * *

UNITED STATES PATENT AND TRADEMARK OFFICE
CERTIFICATE OF CORRECTION

| | | |
|---|---|---|
| PATENT NO. | : 7,516,221 B2 | Page 1 of 1 |
| APPLICATION NO. | : 10/917873 | |
| DATED | : April 7, 2009 | |
| INVENTOR(S) | : Souder et al. | |

It is certified that error appears in the above-identified patent and that said Letters Patent is hereby corrected as shown below:

In column 21, line 7, in claim 12, delete "." and insert -- ; --, therefor.

Signed and Sealed this

Eighth Day of June, 2010

David J. Kappos
*Director of the United States Patent and Trademark Office*